Feb. 4, 1936.  J. C. SCHELLIN  2,029,798
HOSE COUPLING THREAD TERMINUS INDICATOR
Filed April 30, 1934
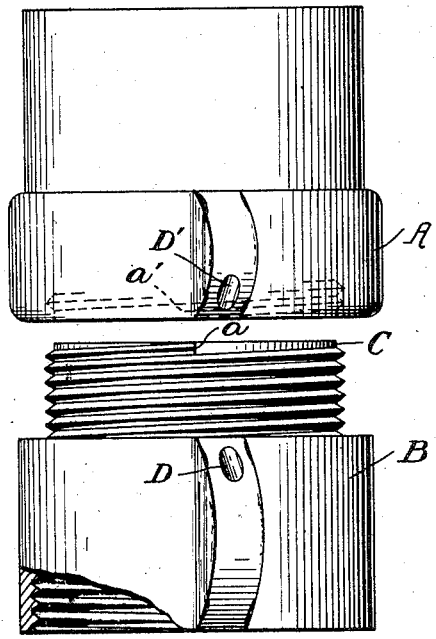
Inventor:
John C. Schellin
By Hiram Swartz Atty.

Patented Feb. 4, 1936

2,029,798

UNITED STATES PATENT OFFICE 2,029,798

HOSE COUPLING THREAD TERMINUS INDICATOR

John C. Schellin, Wooster, Ohio

Application April 30, 1934, Serial No. 723,076

1 Claim. (Cl. 285—46)

My invention relates to improvements in hose couplings, and particularly such as are used on fire-hose lines, and the like. Its principal object is to provide improved means for making immediate connection between opposite threaded coupling members, and for avoiding delay in making threaded engagement of coupling members with each other.

It is well known in the industry that very often, in case of a rapidly progressing fire, it is necessary for firemen to speedily connect hose lines to each other and to hydrants, in order to quickly stem the rapidly increasing conflagration; and that quite frequently this must be done when darkness prevents clear vision, or tempestuous or icy conditions obstruct the proper manipulation of the coupling members, making it difficult to determine the exact relation of opposing threads to each other, and start the thread connection. Experience has shown that valuable time may be saved in fire fighting service, when time is an important factor in the protection of life and property interests, by suitable means for manually detecting the relative positions of the termini of the opposing threads of the coupling, so that they may be instantly connected, regardless of weather or other adverse conditions, and so that complete thread engagement of the coupling members can be made without fumbling or loss of time in giving the coupling swivel several complete turns before the union can be accomplished, or thread engagement can be made. To accomplish this important object I provide the means, substantially as shown in the drawing, for manually detecting the relative positions of the termini of the connecting thread members of the coupling.

Referring to the drawing, Fig. 1 is a plan view of a hose coupling in which A indicates the swivel member thereof, B, the hose bowl and C the threaded portion thereof, intended to engage the said swivel. D indicates one form of a detector located in the outer surface of the bowl immediately opposite the thread terminus $a$, indicated by the arrow, and D' shows a similar detector of the thread terminus, shown in dotted lines $a'$, within the swivel member A, located directly opposite the terminus of the thread therein. The form of the indicating means may be varied, and its location on the surface of the coupling member may be changed, provided its location be immediately opposite the end of the thread, and be easily accessible to the hands of the person making the threaded connection.

What I claim is—

A threaded hose coupling having wrench engaging lugs of conventional type with the ends of the threads on mating parts co-axial with one of the lugs on each part, and having indicating means on said lugs for showing the proper positioning of the parts for quick threaded engagements.

JOHN C. SCHELLIN.